(12) United States Patent
Muramatsu

(10) Patent No.: US 8,984,988 B2
(45) Date of Patent: Mar. 24, 2015

(54) STEERING WHEEL WITH FINISHER

(71) Applicant: Nihon Plast Co., Ltd., Fujinomiya-shi, Shizuoka (JP)

(72) Inventor: Katsuya Muramatsu, Fujinomiya (JP)

(73) Assignee: Nihon Plast Co., Ltd., Fujinomiya-shi (JP)

( * ) Notice: Subject to any disclaimer, the term of this patent is extended or adjusted under 35 U.S.C. 154(b) by 29 days.

(21) Appl. No.: 13/893,608

(22) Filed: May 14, 2013

(65) Prior Publication Data

US 2013/0298722 A1      Nov. 14, 2013

(30) Foreign Application Priority Data

May 14, 2012   (JP) .................................. 2012-110564

(51) Int. Cl.
*B62D 1/10*   (2006.01)
*B62D 1/11*   (2006.01)

(52) U.S. Cl.
CPC ... *B62D 1/10* (2013.01); *B62D 1/11* (2013.01)
USPC ........................................................... 74/552

(58) Field of Classification Search
USPC ............ 74/552, 558; 29/594.1; 280/750, 731, 280/777
See application file for complete search history.

(56) References Cited

U.S. PATENT DOCUMENTS

| 4,920,822 A * | 5/1990 | Abiko ............................. 74/552 |
| 2007/0193399 A1 * | 8/2007 | Vigeant et al. .................. 74/552 |

FOREIGN PATENT DOCUMENTS

JP          2009-208571 A      9/2009

* cited by examiner

*Primary Examiner* — Thomas Diaz
(74) *Attorney, Agent, or Firm* — Marvin A. Motsenbocker; Mots Law, PLLC

(57) ABSTRACT

In a lower end of a finisher having a substantially I-shape, an extending portion extending along a rim is provided. The finisher has an upper locking portion to be locked to an upper spoke and a lower locking portion provided in the extending portion and to be locked to a lower spoke. The lower locking portion has a protruding portion and a locking piece both standing upright from a back surface of the extending portion. The protruding portion and the locking piece are arranged away from each other in an up-down direction. The lower spoke has an engagement receiving portion for the protruding portion to be fitted and for the locking piece to be engaged.

4 Claims, 4 Drawing Sheets

STEERING WHEEL WITH FINISHER

CROSS REFERENCE TO RELATED APPLICATION

This application is based upon and claims the benefit of priority from the prior Japanese Patent Application No. 2012-110564, filed on May 14, 2012, the entire contents of which are incorporated herein by reference.

BACKGROUND

1. Technical Field

The present invention relates to a steering wheel for steering a vehicle and particularly relates to a steering wheel with finisher.

2. Related Art

Recently, there are proposed various types of steering wheels employing deformable metal core structures to secure safety of drivers in vehicle crashes and the like. Such a steering wheel employs the following configuration: When an impact load is applied to, for example, the steering wheel in a vehicle crash or the like, a rim, which forms a turning outer periphery of the steering wheel, and spokes, which connect the rim and a boss, deform to an opposite side to a driver, thereby absorbing and alleviating the impact on the driver coming into contact with the steering wheel.

In order to absorb as much impact as possible by the deformation of the rim and the spokes, the rim and the spokes which deform upon receiving the impact load are desirably configured to deform in a larger degree. Meanwhile, a configuration in which the boss and the spokes are decorated with a finisher is used in many of the steering wheels. Moreover, the finisher is configured to cover the boss and the spokes. However, the finisher is generally not configured to follow the deformation of the rim and the spokes even when the rim and the spokes deform.

To solve this problem, Japanese Patent Application Publication No. 2009-208571 proposes a steering device for a vehicle in which a steering wheel can largely deform without being hindered by a finisher when an impact load acts on the steering wheel.

In the steering device for a vehicle in Japanese Patent Application Publication No. 2009-208571, a garnish (finisher) formed in a substantially Y-shape in a top view of the steering wheel in a neutral state thereof is arranged in an outer peripheral region of a steering pad disposed at the center of the steering wheel.

On a back surface of a vertical bar portion of the garnish, more specifically, on a back surface of a bar portion which extends in a vertical direction and which branches into two in the middle of the substantially Y-shape, locking protrusions and a locking claw are formed. In the top view of the steering wheel in the neutral state thereof, a spoke arranged on a lower side is configured as having a pair of frame portions. A locking piece to which the locking claw formed on the back surface of the garnish is locked is configured to be laid between the pair of frame portions. Moreover, engagement holes to which the locking protrusions formed on the back surface of the garnish are fitted are formed on a rim side of the pair of frame portions.

When the impact load acts on the steering wheel configured as described above, since the garnish is formed in the substantially Y-shape, the garnish acts like a strut against the deformation of the rim and the spokes and hinders the deformation of the steering wheel.

In this respect, in the steering device for a vehicle in Japanese Patent Application Publication No. 2009-208571, a fragile portion arranged to extend substantially along an external shape of the steering pad is formed in the garnish. Then, when the impact load acts on the steering wheel, bending deformation about the fragile portion occurs in the garnish. The garnish is thus configured to follow the deformation of the steering wheel.

Moreover, the garnish formed in the substantially Y-shape is formed such that the width dimension in the vertical bar portion is larger than the width dimensions in oblique portions branched into two. Configuring the garnish to have a larger width dimension in the vertical bar portion facilitates the bending deformation in the fragile portion.

SUMMARY

In the steering device for a vehicle described in Japanese Patent Application Publication No. 2009-208571, when the impact load acts on the steering wheel and the fragile portion formed in the garnish breaks, a broken surface of the garnish is exposed facing the outside. Particularly, the locking claw formed on the back surface of the garnish is formed in a portion closer to the steering pad than the fragile portion is.

This is a configuration to hold the portion of the garnish close to the steering pad with the locking claw, and the fragile portion is thereby configured to easily break. Since the steering device is configured as descried above, various measures have to be taken to achieve a configuration in which the broken surface of the garnish is prevented from protruding outward. An increase in cost and an increase in weight of the garnish are thereby inevitable to achieve the configuration.

Meanwhile, in recent years, instead of the configuration using the garnish formed in the substantially Y-shape for the outer peripheral region of the steering pad, a configuration using a pair of left and right I-shaped garnishes formed separately in a top view of a steering wheel in a neutral state thereof is employed as a configuration of a steering wheel, from a view point of design.

In such a configuration using the pair of garnishes, each of the garnishes is inevitably formed to have a small width dimension in a spoke arranged on a lower side, in the top view of the steering wheel in the neutral state thereof.

Specifically, lower ends of the pair of garnishes are configured to be arranged within the width dimension of the vertical bar portion of the garnish if the garnish were to be formed in the substantially Y-shape. Accordingly, each of the pair of the garnishes is inevitably formed to have a small width dimensions in the lower end thereof. Moreover, the garnish is formed to have a U-shaped horizontal cross-section.

As a result, in the steering wheel using the pair of garnishes, how to make terminal ends of the lower ends of the respective garnishes follow the deformation of the steering wheel is a major problem.

Moreover, when each of the garnishes having the U-shaped horizontal cross section is made to deform in a deformation direction of the steering wheel as it is, the garish cannot follow the direction of the deformation of the steering wheel unless both side surfaces of the U-shape are deformed to expand outward.

Here, in order to cause deformation in which both side surfaces of the U-shape expand outward, a large bending stress needs to be applied and the garnishes act as a resistance hindering the deformation of the steering wheel.

An object of the present invention is to provide a steering wheel with a finisher which allows a rim and spoke to deform by causing the finisher to follow the deformation of the rim and the spokes when an impact load acts on the steering wheel, and which can prevent a terminal end on a lower end side of the finisher from separating from a contact state with the rim.

A steering wheel in accordance with some embodiments includes: a rim serving as a grip for steering; a boss connected to a steering shaft and disposed inside the rim; spokes connecting the rim and the boss to each other, and including an upper spoke and a lower spoke being arranged away from each other in an up-down direction and being respectively disposed on an upper side and a lower side in a top view of the steering wheel in a neutral state of the steering wheel; a finisher disposed to lie between the upper spoke and the lower spoke and having a substantially I-shape in the top view; and a steering pad covering the boss and disposed away from an inner surface of the finisher. The finisher has an extending portion extending in a lower end of the finisher along the rim in the top view. The finisher has an upper locking portion configured to be locked to the upper spoke and a lower locking portion provided in the extending portion and configured to be locked to the lower spoke. The lower locking portion has a protruding portion and a locking piece both standing upright from a back surface of the extending portion. The protruding portion and the locking piece are arranged away from each other in the up-down direction. The lower spoke has an engagement receiving portion for the protruding portion to be fitted and for the locking piece to be engaged. The extending portion is covered with the steering pad.

According to the configuration described above, when an impact load acts on the steering wheel and the rim and the spokes deform to be bent to the opposite side to the driver, a section of the engagement receiving portion in engagement with the locking piece moves to turn toward the locking piece. Then, the lower locking portion of the finisher deforms by being pulled by the section of the engagement receiving portion in engagement with the locking piece and follow the deformation of the steering wheel. In addition, even if the finisher deforms to follow the deformation of the steering wheel, the locking piece is not separated from the section of the engagement receiving portion in engagement with the locking piece.

Moreover, the extending portion in which the locking piece stands upright on the back surface of the extending portion is configured to extend along the rim. Accordingly, in the deformation of the steering wheel, the extending portion deforms in the deformation direction of the steering wheel while twisting the inner side surface of the finisher on the steering pad side.

Since the steering wheel is configured as described above, even if the horizontal cross section of the finisher is formed in a U-shape, the finisher can be made to follow the direction of the deformation of the steering wheel with the inner surface of the finisher on the steering pad side twisted.

This will be described more specifically. When the finisher having the U-shaped horizontal cross section is made to deform in the deformation direction of the steering wheel as it is, the finisher cannot follow the direction of the deformation of the steering wheel unless both side surfaces of the U-shape deform to expand outward.

However, in the configuration described above, since the steering device is configured such that one of the side surfaces in the U-shape of the finisher is twisted according to the deformation direction of the steering wheel, the finisher can follow the direction of the deformation of the steering wheel while being twisted even if both side surfaces of the U-shape are not deformed to expand outward.

Moreover, a stress deforming the finisher while twisting the finisher is smaller than a stress required to deform both side surfaces of the U-shape in such a way that both side surfaces expand outward. Accordingly, the finisher can be made to easily follow the direction of the deformation of the steering wheel without the fragile portion formed in the finisher. Furthermore, the extending portion of the finisher is configured to be covered with the steering pad. Accordingly, the steering wheel can be excellent also in design.

The extending portion may have an opening separating a base end of the protruding portion and a base end of the locking piece from each other.

According to the configuration described above, the protruding portion and the locking piece can deform independently in the deformation of the steering wheel.

Independent deformation of the protruding portion and the locking piece makes it easier for the lower locking portion to follow the deformation of the steering wheel. In addition, the finisher can follow the deformation of the steering wheel without separation of the lower end of the finisher in which the lower locking portion is formed from the rim.

The upper spoke may have an elongated hole formed to extend in the up-down direction and configured to engage with the upper engagement portion so as to allow the upper engagement portion to slide along the elongated hole.

Here, description is given of, for example, a case where the steering wheel deforms while turning and moving toward the steering shaft in the top view of the steering wheel in the neutral state thereof. In this case, a stress causing the lower end of the finisher to move and turn toward the steering shaft acts on the finisher following the deformation of the steering wheel.

In the configuration described above, the upper locking portion in the finisher is configured to be slidable along the elongated hole and also to be locked to the elongated hole. Accordingly, even when the stress causing the lower end of the finisher to move and turn toward the steering shaft acts, sliding of the upper locking portion along the elongated hole can cause the lower end of the finisher to smoothly move and turn toward the steering shaft.

According to the configuration described above, the finisher can be made to follow the deformation of the steering wheel without separation of the lower end of the finisher in which the lower locking portion is formed from the rim.

The finisher may include first and second finishers, and the extending portion of the first finisher and the extending portion of the second finisher may extend toward an opposite one of the first and second finishers in the top view.

According to the configuration described above, when an impact load acts on the steering wheel and the rim and the spokes deform to be bent to the opposite side to the driver, sections of the engagement receiving portions in engagement with the locking pieces move to turn toward the locking pieces. Then, the lower locking portions of the first and second finishers deform by being pulled by the sections of the engagement receiving portions in engagement with the locking pieces and follow the deformation of the steering wheel. In addition, even if the first and second finishers deform to follow the deformation of the steering wheel, the locking pieces are not separated from the sections of the engagement receiving portions in engagement with the locking pieces.

Moreover, each of the extending portions in which the locking piece stand upright on the back surface is arranged and configured to extend from the lower end of a corresponding one of the first and second finishers toward the opposite finisher. Accordingly, in the deformation of the steering wheel, the extending portions deform in the deformation direction of the steering wheel while twisting the inner side surfaces of the first and second finishers on the steering pad side.

Since the steering wheel is configured as described above, even if the horizontal cross sections of the first and second finishers are formed in U-shapes, the first and second finishers can be made to follow the direction of the deformation of the steering wheel with the inner surfaces of the first and second finishers on the steering pad side twisted.

This will be described more specifically. When each of the finishers having the U-shaped horizontal cross section is made to deform in the deformation direction of the steering wheel as it is, the finisher cannot follow the direction of the deformation of the steering wheel unless both side surfaces of the U-shape deform to expand outward.

However, in the configuration described above, since the steering device is configured such that one of the side surfaces in the U-shape of each of the first and second finishers is twisted according to the deformation direction of the steering wheel, the first and second finishers can follow the direction of the deformation of the steering wheel while being twisted even if both side surfaces of the U-shape are not deformed to expand outward.

Moreover, a stress deforming the first and second finishers while twisting the first and second finishers is smaller than a stress required to deform both side surfaces of the U-shape in such a way that both side surfaces expand outward. Accordingly, the first and second finishers can be made to easily follow the direction of the deformation of the steering wheel without the fragile portions formed in the first and second finishers. Furthermore, the extending portions of the first and second finishers are configured to be covered with the steering pad. Accordingly, the steering wheel can be excellent also in design.

Also in the case as described above where two finishers (the first and second finishers) are provided, it is possible to produce the effects similar to the effects of the case as previously described where only a single finisher is provided.

DETAILED DESCRIPTION

An embodiment of the present invention is specifically described below based on the attached drawings. Shapes and arrangement configurations which are different from the shape and arrangement configuration to be described below can be employed as the configuration of a steering wheel including finishers of the present invention as long as the shapes and arrangement configurations can solve the problems of the present invention. The present invention is thus not limited to the embodiment described below and various modifications can be made thereto.

Figure 1:
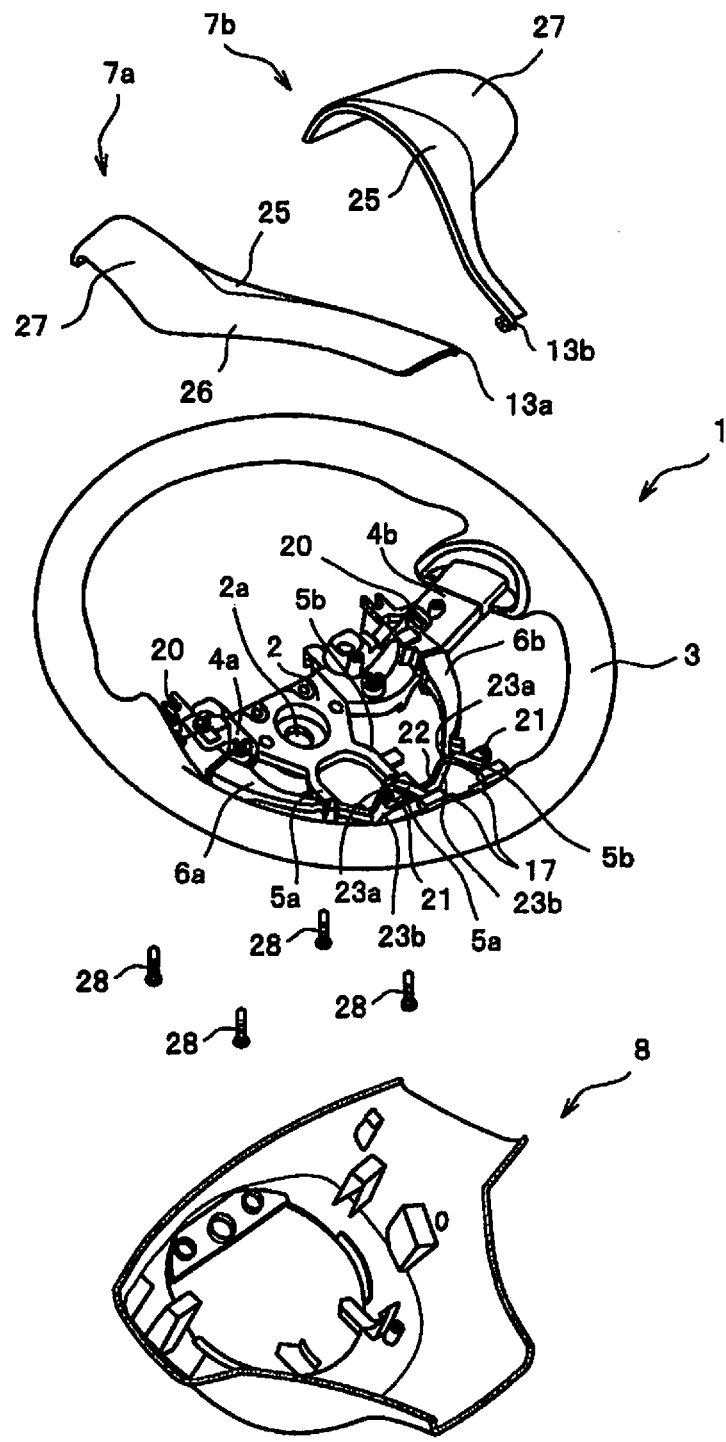
FIG. 1 is a perspective view of a steering wheel in an embodiment of the present invention which is shown in a state before a pair of finishers and a lower cover are installed thereon.

The embodiment of the present invention is described by using FIGS. 1 to 5. Note that, in the description, an up-down direction is defined such that a top end side and a bottom end side of a steering wheel 1 in a top view of the steering wheel 1 in a neutral state thereof are respectively an upper side and a lower side. Moreover, a direction intersecting the up-down direction is defined as a left-right direction. As shown in FIG. 1, the steering wheel 1 includes: a boss 2 having a steering shaft attachment hole 2a to which a not-illustrated steering shaft is connected; a rim 3 configured to be gripped by a driver (i.e. serving as a grip for steering); and spokes 4a, 4b, 5a, 5b, 6a, 6b connecting the boss 2 and a metal core of the rim 3 to each other. The metal core of the rim 3, the boss 2, and the spokes 4a, 4b, 5a, 5b, 6a, 6b are integrally molded by using an aluminum alloy or a magnesium alloy.

Figure 2:
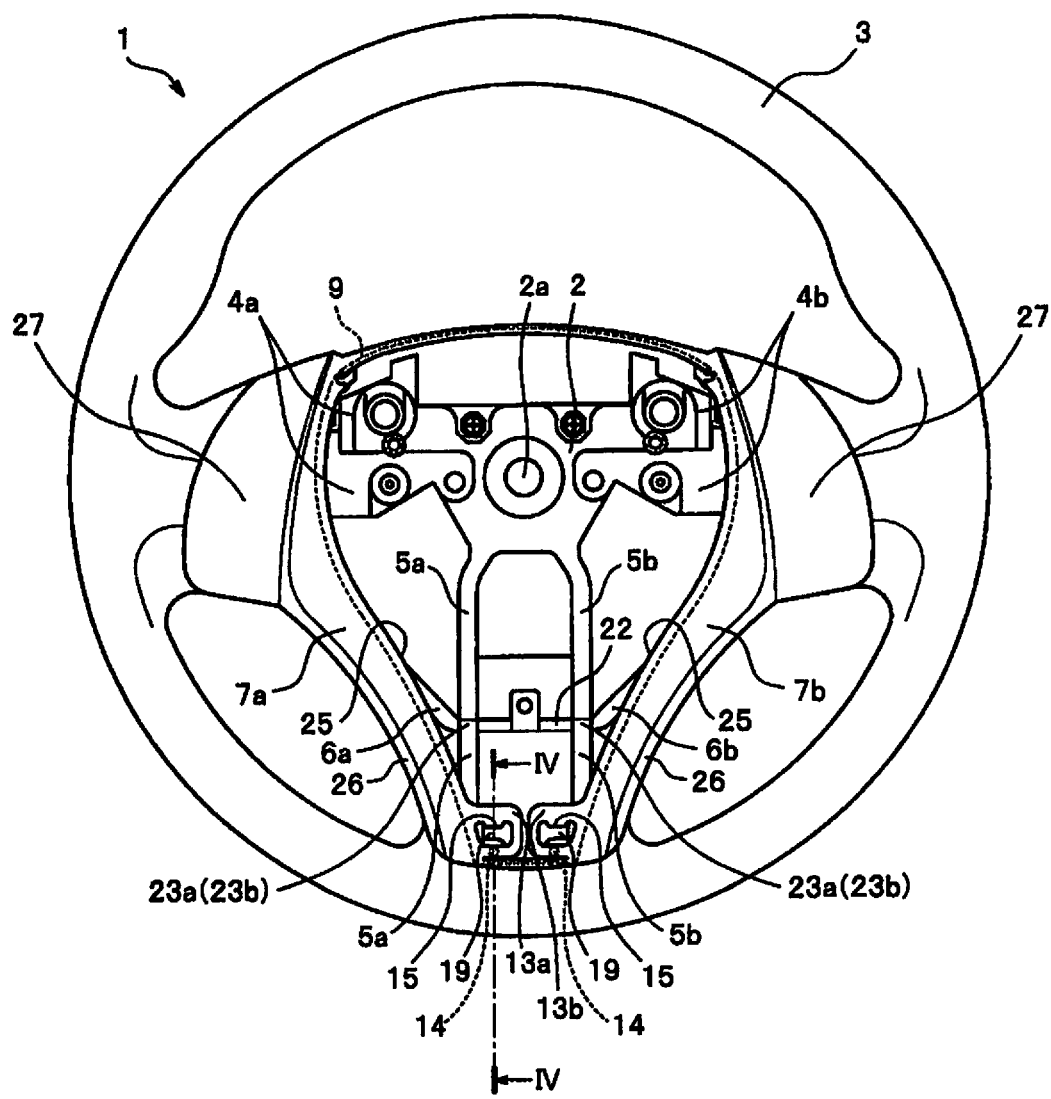
FIG. 2 is a front view of the steering wheel in the embodiment of the present invention which is shown in a state where a steering pad is invisible and the finishers are installed.

An occupant side of the boss 2 is covered with a steering pad 9 (see FIG. 2) and the spokes 4a, 4b, 5a, 5b, 6a, 6b are covered with a pair of finishers 7a, 7b, so that the boss 2 and the spokes 4a, 4b, 5a, 5b, 6a, 6b may not be exposed on the driver side. An outer peripheral edge of the steering pad 9 is disposed with desired gaps provided between (i.e. away from) inner surfaces 25 of the pair of finishers 7a, 7b. In FIG. 2, a steering pad 9 in an invisible state is shown by broken lines.

Each of the finishers 7a, 7b is formed such that a horizontal cross-sectional shape thereof is a U-shape in which the inner side surface 25 and an outer side surface 26 are connected to each other by an upper surface, and has a substantially I-shape in the top view of the steering wheel in the neutral state thereof. The inner side surface 25 and the outer side surface 26 of each of the finishers 7a, 7b can have desired designs. Switches and the like can be disposed as necessary in an end portion upper surface 27 on the upper side of each of the finishers 7a, 7b.

A lower cover 8 is arranged on a back surface side of the steering wheel 1 and the back surface side of the steering wheel 1 is covered with the lower cover 8. Each of the steering pad 9, the finishers 7a, 7b, and the lower cover 8 is formed by integral molding using a hard synthetic resin material such as an ABS resin material.

An outer peripheral portion of the metal core of the rim 3 connected to the spokes 4a, 4b, 5a, 5b, 6a, 6b is covered with a soft synthetic resin material or the like.

A description is given of the arrangement configuration of the spokes 4a, 4b, 5a, 5b, 6a, 6b in the top view of the steering wheel in the neutral state thereof. Each of the spokes 4a, 4b has a shape extending in the left-right direction from the boss 2 and an extending front end portion thereof is connected to the metal core of the rim 3. Each of the spokes 5a, 5b has a shape extending to a lower side from the boss 2. Each of the spokes 5a, 5b is formed in a shape bent toward the occupant side at a lower bent portion 23b located in the middle and away from the boss 2. Each of the spokes 5a, 5b bent toward the occupant side has a shape bent to the lower side in an upper bent portion 23a and connected to the metal core of the rim 3.

A reinforcement portion 22 is formed between the lower bent portions 23b of the respective spokes 5a, 5b. The reinforcement portion 22 is connected to the spokes 4a, 4b disposed in an upper portion, via the spokes 6a, 6b, respectively. Formation of the reinforcement portion 22 and the spokes 6a, 6b allows operations of the rim 3 to be surely transmitted to the boss 2. Moreover, even when the spokes 4a, 4b and the spokes 5a, 5b are reduced in weight, the strength in the spokes 4a, 4b and the spokes 5a, 5b can be improved by the reinforcement portion 22 and the spokes 6a, 6b. Accordingly, the operations of the rim 3 can be surely transmitted to the boss 2.

Figure 3:
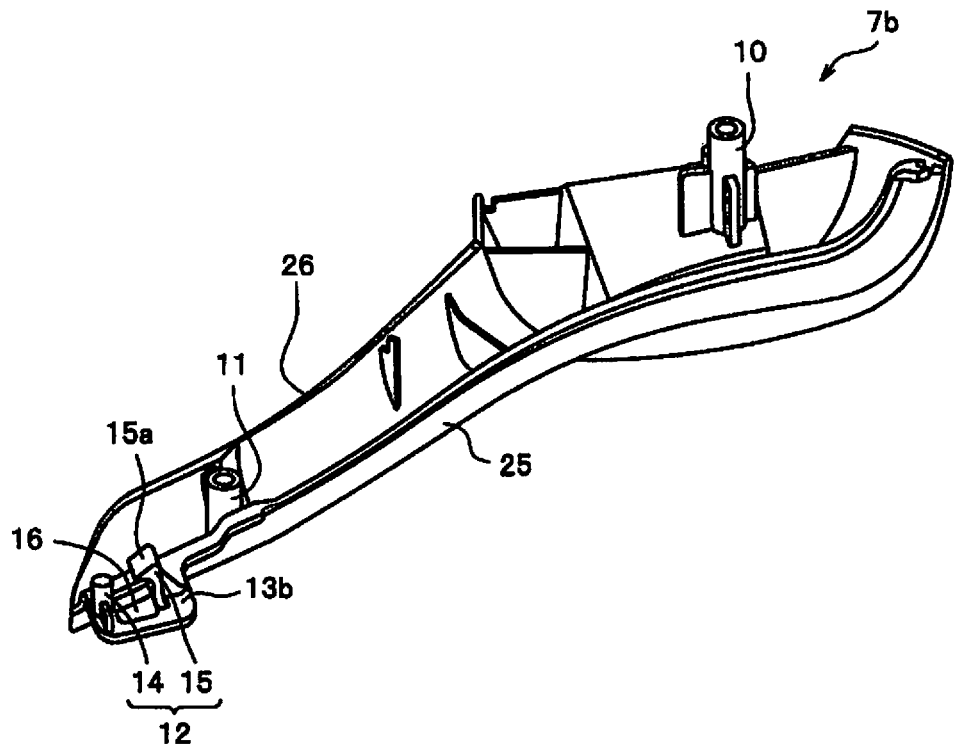
FIG. 3 is a perspective view showing a back surface side of the finisher in the embodiment of the present invention.

FIG. 3 shows a configuration of the finisher 7b on the back surface. The shapes of the finishers 7a, 7b are configured to be mirror symmetric to each other. Accordingly, the finisher 7a is formed such that the configuration on the back surface thereof is an arrangement configuration mirror symmetric to the configuration of the finisher 7b on the back surface. Hence, the illustration of the configuration of the finisher 7a on the back surface is omitted.

As shown in FIG. 3, on the back surface of each of the finishers 7a, 7b, an upper locking portion 10 is formed to stand upright from the back surface of the finisher 7a, 7b in a portion on an upper end side of the finisher 7a, 7b. On the back surface of each of the finishers 7a, 7b, a lower locking portion 12 is formed in a portion on a lower end side of the finisher 7a, 7b. An intermediate locking portion 11 is formed to stand upright from the back surface of each of the finishers 7a, 7b in a portion closer to the lower end, between the lower end and the upper end of the finisher 7a, 7b.

Extending portions 13a, 13b are provided respectively on the lower end sides of the finishers 7a, 7b, the extending portions 13a, 13b each extending toward an opposite one of the finishers 7a, 7b and approximately along the rim 3 in a state where the finishers 7a, 7b are attached to the steering wheel 1. A protruding portion 14 and a locking piece 15 stands upright on a back Surface of each of the extending portions 13a, 13b.

An opening 16 is formed in each of the extending portions 13a, 13b. In each of the extending portions 13a, 13b, the protruding portion 14 and the locking piece 15 are arranged in the up-down direction with the opening 16 interposed therebetween. The opening 16 separates a base end of the protruding portion 19 and a base end of the locking piece 15 from each other. A claw portion 15a protruding toward the protruding portion 14 is formed in a head portion of the locking piece 15. Each of the lower locking portions 12 is formed of the extending portion 13a, 13b, the protruding portion 14, and the locking piece 15.

A fitting hole 18 (see FIG. 4) to which the protruding portion 14 formed on the back surface of the extending portion 13a, 13b and a locking portion 19 (see FIG. 4) with which the claw portion 15a of the locking piece 15 is engaged are formed in a lower end side of each of the spokes 5a, 5b. An engagement receiving portion 17 is formed of the fitting hole 18 and the locking portion 19.

Figure 4:
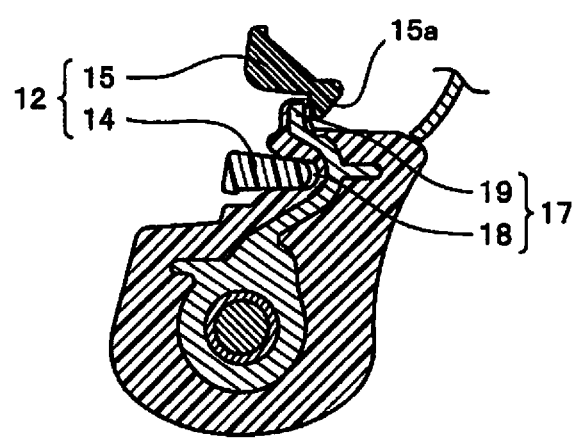
FIG. 4 is a cross-sectional view taken along the line IV-IV of FIG. 2.
Figure 5:
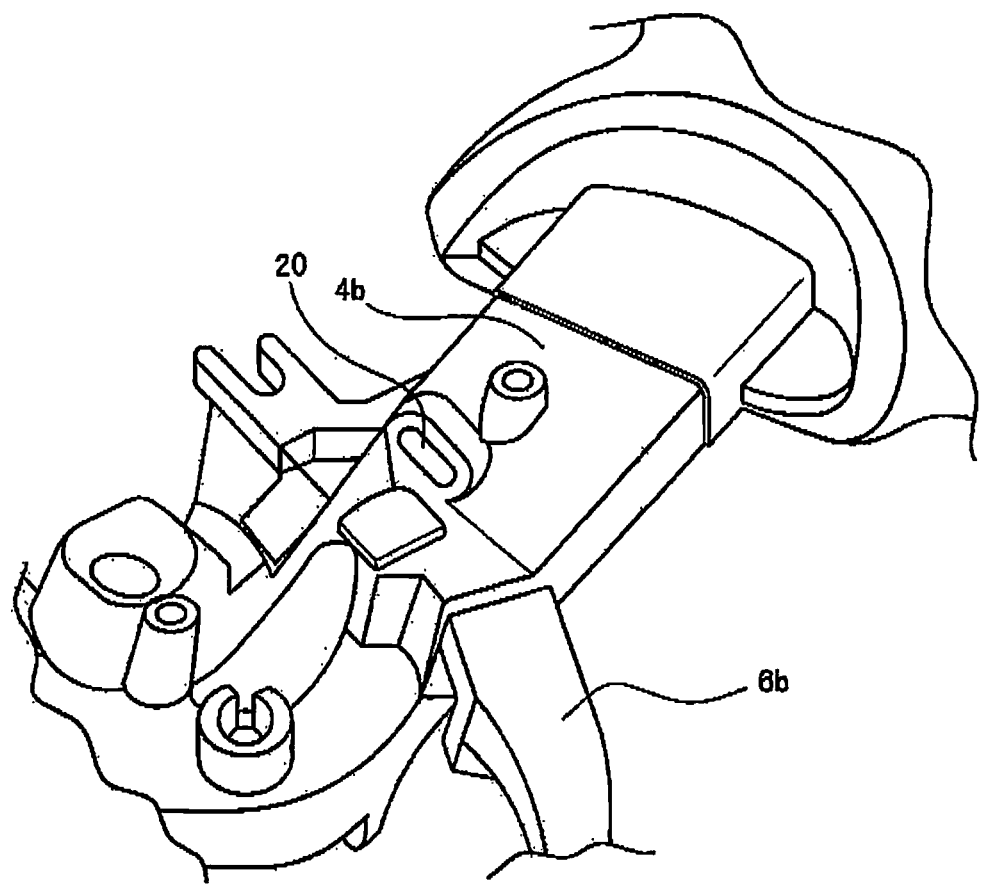
FIG. 5 is an enlarged view of a main portion around a elongated hole in FIG. 1.

FIG. 4 is a cross-sectional view taken along the line IV-IV of FIG. 2 and shows an engagement state between the lower locking portion 12 and the engagement receiving portion 17. FIG. 2 shows a state where the pair of finishers 7a, 7b are attached to the steering wheel 1. Specifically, in the state where the lower locking portions 12 and the engagement receiving portions 17 are in engagement, screws 28 in FIG. 1 are inserted from the back surface side of elongated holes 20 (see FIGS. 1 and 5) formed in the spokes 4a, 4b and attachment portions 21 formed in the spokes 5a, 5b, and are screwed to the upper locking portions 10 and the intermediate locking portions 11. The finishers 7a, 7b can be thus attached to extend over the spokes 4a, 4b and the spokes 5a, 5b which are arranged away from each other in the up-down direction.

The upper locking portions 10 are attached close to lower ends of the elongated holes 20 formed in the spokes 4a, 4b. Accordingly, when an impact load acts on the steering wheel 1 and the steering wheel 1 deforms to an opposite side to the driver, the upper locking portions 10 of the finishers 7a, 7b can slide along the insides of the elongated holes 20 toward upper ends thereof.

Next, a case where the impact load acts on the steering wheel 1 and the rim 3 and the spokes 5a, 5b deform to be bent to the opposite side of the driver are given as an example, and description is given of how the finishers 7a, 7b deform to follow this deformation in the case of this example. When the impact load acts on the steering wheel 1 and the rim 3 and the spokes 5a, 5b deform to be bent to the opposite side to the driver, the locking portions 19 of the engagement receiving portions 17 in engagement with the locking pieces 15 move to turn toward the not-illustrated steering shaft.

At this time, the locking portions 19 of the spokes 5a, 5b in engagement with the locking pieces 15 of the finishers 7a, 7b turn in such a direction that the engagement state with the claw portions 15a of the locking pieces 15 are maintained. At this time, depending on a bending-deforming direction in which the rim 3 and the spokes 5a, 5b deform to the opposite side to the driver, the locking pieces 15 are set to a state where the locking pieces 15 are pulled to turn toward the not-illustrated steering shaft or to a state where the locking pieces 15 push the finishers 7a, 7b to the upper side.

Even when the finishers 7a, 7b are in such states, since the upper locking portions 10 are engaged with the elongated holes 20, the upper locking portions 10 slide along the insides of the elongated holes 20 and the finishers 7a, 7b can thus tolerate these states. Moreover, even when the upper locking portions 10 slide along the insides of the elongated holes 20, the engagement state between the lower locking portions 12 and the engagement receiving portions 17 is maintained.

The finishers 7a, 7b can thus follow the deformation of the steering wheel 1. Moreover, since the lower ends of the finishers 7a, 7b can deform while maintaining a contact state with the rim 3, the end portions of the finishers 7a, 7b can be prevented from projecting outward even when the steering wheel 1 deforms.

In a case where the finishers 7a, 7b formed to have the U-shaped horizontal cross sections are bent toward open sides of the U shapes as they are, the finishers 7a, 7b cannot follow the direction of the deformation of the steering wheel 1 unless the inner side surface 25 and the outer side surface 26 of each U-shape deform to expand outward. Furthermore, in order to bend the finishers 7a, 7b in such a way, a large stress must be applied to the finishers 7a, 7b.

The fact that a large stress needs to be applied to the finishers 7a, 7b to bend the finishers 7a, 7b means that the finishers 7a, 7b are a large resistance against the deformation of the steering wheel 1.

In the embodiment of the present invention, bending forces act on the extending portions 13a, 13b provided in the finishers 7a, 7b by the deformation of the steering wheel 1. Accordingly, in the deformation of the steering wheel 1, the extending portions 13a, 13b deform to follow the direction of the deformation of the steering wheel 1 while twisting the inner side surfaces 25 of the finishers 7a, 7b on the steering pad 9 side.

Moreover, a stress smaller than the above-described stress required to expand the inner side surface 25 and the outer side surface 26 of each U-shape outward is sufficient as a stress which causes the finishers 7a, 7b to follow the direction of the deformation of the steering wheel 1 while twisting the inner side surfaces 25 of the finishers 7a, 7b. As a result, even when the horizontal cross sections of the finishers 7a, 7b are formed in the U-shapes, the finishers 7a, 7b can easily follow direction of the deformation of the steering wheel 1 and are thus not a large resistance against the deformation of the steering wheel 1.

Furthermore, the opening 16 is formed in each of the extending portions 13a, 13b. Accordingly, the protruding portion 14 and the locking piece 15 arranged to opposite to each other in the up-down direction with the opening 16 interposed therebetween can deform independently from each other in the deformation of the steering wheel 1.

Independent deformation of the protruding portion 14 and the locking piece 15 makes it easier for the lower locking portion 12 to follow the deformation of the steering wheel 1. In addition, the finishers 7a, 7b can follow the deformation of the steering wheel 1 without separation of the lower ends of the finishers 7a, 7b in which the lower locking portions 12 are formed from the rim 3.

Moreover, the upper bent portions 23a are formed respectively in the spokes 5a, 5b. Accordingly, the spokes 5a, 5b can deform about the upper bent portions 23a in the deformation of the steering wheel 1. In addition, since the deformation of the spokes 5a, 5b can be made to occur about the lower bent portions 23b, the spokes 5a, 5b can easily deform.

Furthermore, even though the spokes 5a, 5b are configured to be easily deformable, the steering wheel 1 is configured such that operations of the rim 3 can be surely transmitted to the boss 2 by the reinforcement portion 22 formed between the lower bent portions 23b of the spokes 5a, 5b and by the spokes 6a, 6b arranged between the spokes 5a, 5b and the spokes 4a, 4b.

Moreover, since the extending portions 13a, 13b forming the lower locking portions 12 of the finishers 7a, 7b are covered with the steering pad, the extending portions 13a, 13b are not exposed and the design is thereby excellent.

In the embodiment above, the explanation is made about the steering wheel 1 which includes the pair of left and right finishers 7a, 7b. However, the present invention is not limited to this. For example, only one of the left finisher 7a and the right finisher 7b may be provided. Moreover, only one of the left finisher 7a and the right finisher 7b may have the configuration of the embodiment above. In this instance, the extending portion (13a or 13b) of one finisher (7a or 7b) to which the embodiment above is applied may be provided to extend approximately along the rim 3. The other finisher to which the embodiment above is not applied may be provided with a switch block and the like in the middle portion between the upper portion and the lower portion of the other finisher, for example. In this instance, means other than the embodiment above may be provided to be tensile, stretchable, or deformable in dimensions between the upper portion and the switch block and between the lower portion and the switch block.

The invention claimed is:

1. A steering wheel comprising:
a rim serving as a grip for steering;
a boss connected to a steering shaft and disposed inside the rim;
spokes connecting the rim and the boss to each other, and including an upper spoke and a lower spoke being arranged away from each other in an up-down direction and being respectively disposed on an upper side and a lower side in a top view of the steering wheel in a neutral state of the steering wheel;
a finisher disposed to lie between the upper spoke and the lower spoke; and
a steering pad covering the boss and disposed away from an inner surface of the finisher, wherein
the finisher has an extending portion extending in a lower end of the finisher along the rim in the top view,
the finisher has an upper locking portion configured to be locked to the upper spoke slidably in the up-down direction and a lower locking portion provided in the extending portion and configured to be locked to the lower spoke,
the lower locking portion has a protruding portion and a locking piece both standing upright from a back surface of the extending portion,
the protruding portion and the locking piece are arranged away from each other in the up-down direction,
the lower spoke has an engagement receiving portion for the protruding portion to be fitted and for the locking piece to be engaged, and
the extending portion is covered with the steering pad,
wherein the upper spoke has an elongated hole formed to extend in the up-down direction and configured to engage with the upper locking portion so as to allow the upper locking portion to slide along the elongated hole.

2. The steering wheel according to claim 1, wherein the extending portion has an opening separating a base end of the protruding portion and a base end of the locking piece from each other.

3. The steering wheel according to claim 1, wherein
the finisher comprises first and second finishers, and
the extending portion of the first finisher and the extending portion of the second finisher extend toward an opposite one of the first and second finishers in the top view.

4. A steering wheel comprising:
a rim serving as a grip for steering;
a boss connected to a steering shaft and disposed inside the rim;
spokes connecting the rim and the boss to each other, and including an upper spoke and a lower spoke being arranged away from each other in an up-down direction and being respectively disposed on an upper side and a lower side in a top view of the steering wheel on a neutral state of the steering wheel;
a finisher disposed to lie between the upper spoke and the lower spoke; and
a steering pad covering the boss and disposed away from an inner surface of the finisher, wherein
the finisher has an extending portion extending in a lower end of the finisher along the rim in the top view,
the finisher has an upper locking portion configured to be locked to the upper spoke and a lower locking portion provided in the extending portion and configured to be locked to the lower spoke,
the lower locking portion has a protruding portion and a locking piece both standing upright from a back surface of the extending portion,
the protruding portion and the locking piece are arranged away from each other in the up-down direction,
the lower spoke has an engagement receiving portion for the protruding portion to be fitted and for the locking piece to be engaged,
the extending portion is covered with the steering pad, and
the extending portion has an opening penetrating the finisher and separating a base end of the protruding portion and a base end of the locking piece from each other.

* * * * *